United States Patent [19]

Lyons

[11] Patent Number: 4,818,094
[45] Date of Patent: Apr. 4, 1989

[54] EYEGLASS RETAINER

[75] Inventor: Todd G. Lyons, Dayton, Ohio

[73] Assignee: Powder Blue U.S.A., Inc., West Carrollton, Ohio

[21] Appl. No.: 66,896

[22] Filed: Jun. 25, 1987

[51] Int. Cl.⁴ .............................................. G02C 3/02
[52] U.S. Cl. ...................................... 351/157; 351/156
[58] Field of Search ................................. 351/156, 157

[56] References Cited

U.S. PATENT DOCUMENTS

| D. 150,474 | 3/1948 | Stangl . | |
|---|---|---|---|
| D. 223,296 | 5/1972 | Lee . | |
| D. 254,377 | 9/1980 | Czerefkow . | |
| 1,612,750 | 3/1926 | Stake . | |
| 2,660,092 | 11/1953 | Bloom | 351/157 |
| 2,704,961 | 5/1955 | Weil . | |
| 4,133,604 | 1/1979 | Fuller | 351/156 |
| 4,696,556 | 9/1987 | Perry, III | 351/157 |

FOREIGN PATENT DOCUMENTS

| 967366 | 3/1950 | France . | |
|---|---|---|---|
| 8701820 | 3/1987 | World Int. Prop. O. | 351/157 |

Primary Examiner—Rodney B. Bovernick
Assistant Examiner—Jay Ryan
Attorney, Agent, or Firm—Biebel, French & Nauman

[57] ABSTRACT

A retainer for a pair of spectacles comprises two separate strips of fabric, each of which includes a portion at one end by which it is connected to one of the temples of the spectacles, and a retaining ring through which the free ends of the fabric strips are received for relative sliding adjustment with respect to the back of the head of the wearer of the spectacles. The fabric strips are of special configuration, with their free ends including portions of sufficiently greater width than most of the remainder of their lengths that these widest portions cannot both pass through the ring simultaneously, thereby preventing accidental separation of the ring from the fabric strips.

2 Claims, 1 Drawing Sheet

U.S. Patent   Apr. 4, 1989   4,818,094
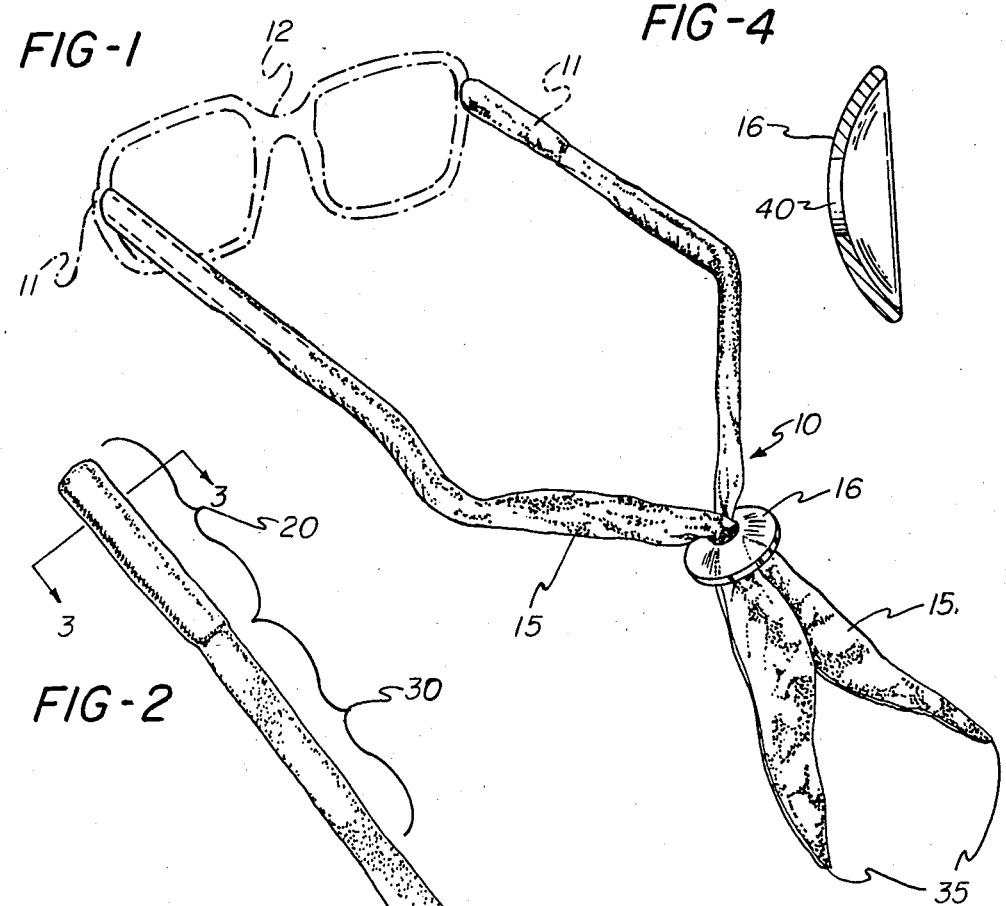
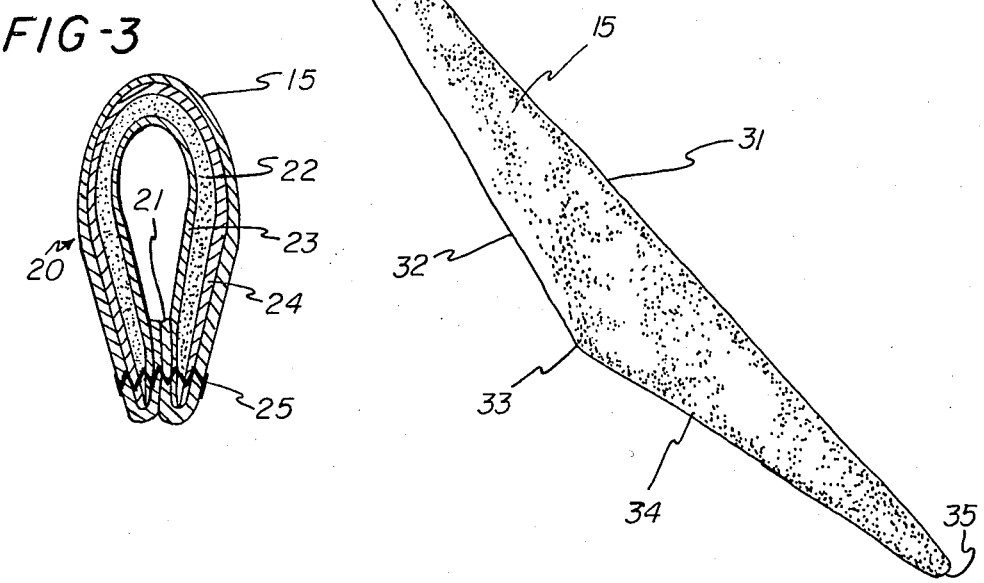

EYEGLASS RETAINER

REFERENCE TO RELATED APPLICATIONS

Cross reference is made to may copending application for design patent, Ser. No. 901,509, filed Aug. 28, 1986.

BACKGROUND OF THE INVENTION

This invention relates to retainers for spectacles which attach to the temples of the spectacles and extend behind the head of the wearer for the purpose of alternatively holding the spectacles in place or suspending them from the wearer's neck.

Devices for this purpose are generally older than any patent now in force, as evidenced by Spina Pat. No. 3,397,026. Most devices of this general type, however, rely upon their elasticity or other means for effecting their adjustment and are not capable of holding the spectacles alternatively in operational and suspended positions, as evidenced by such patents as Fuller U.S. Pat. No. 4,133,604 and Seron Pat. No. 4,136,934.

BRIEF DESCRIPTION OF THE INVENTION

The primary purpose of the present invention is to provide a retainer assembly for spectacles which comprises two separate strips of fabric, each of which includes a portion at one end by which it is connected to one of the temples of the spectacles, and a retaining ring through which the free ends of the fabric strips are received for relative sliding adjustment with respect to the ring. The fabric strips are of special configuration, with their free ends including portions of substantially greater width than most of the remainder of their lengths, so that their widest portions cannot both pass through the ring at the same time although the major portions of their lengths will do so.

A retainer in accordance with the invention can therefore be attached to the temples of a pair of spectacles, and the ring can then be pulled away from the spectacles sufficiently to enable the wearer to position the spectacles properly in place. The wearer then need only grasp the free ends of the fabric strips and pull them apart, which will cause the ring to travel up the strips toward the back of the wearer's head until the retainer is sufficiently tightened to hold the spectacles firmly in place. If the wearer should wish to remove the spectacles but still retain them around the neck, he or she need only to pull the ring back down the fabric strips to establish sufficient slack so that the spectacles can then be dropped from the face and to hang from the wearer's neck.

In addition to these advantages in the use of the retainer of the invention, it has highly decorative properties. More specifically, since the fabric strips include relatively wide portions, these strips can be produced in any desired pattern and/or shade of fabric and will thus serve as a decorative clothing accessory.

BRIEF DESCRIPTION OF THE DRAWINGS

FIG. 1 is a perspective view illustrating a complete spectacle retainer in accordance with the invention;

FIG. 2 is a detailed view of one of the fabric strips in the assembly of FIG. 1;

FIG. 3 is an enlarged section on the line 3—3 of FIG. 2; and

FIG. 4 is a detailed view of the ring member in the assembly of FIG. 1, the view being partly in side elevation and partly in axial section.

DESCRIPTION OF THE PREFERRED EMBODIMENT

In FIG. 1, retainer 10 of the invention is attached to the spectacles of any conventional design including the usual pair of temples 11 hinged to the frame 12. The retainer 10 consists of a pair of strips 15 of fabric of identical shape, each of which is attached at one end to one of the spectacle temples 11, and a ring 16 through which the free ends of the two fabric strips 15 are passed.

Each of th fabric strips 15 is of a double thickness with an internal seam 21, so that each side will present the front side of a printed fabric, and each fabric strip includes a portion 20 at one end by which it is attached to one of the spectacle temples 11. More specifically, the portion 20 encloses a tubular insert 22 of a resilient material such as a neoprene foam, which has a covering 23 on its inner surface of a material such as a nylon having a frictional holding effect on a spectacle temple, and having an outer cover 24 which may be of a material such as lycra having substantial elasticity or may be of the same material as the layer 23. This composite insert is rolled to tubular form and retained within the open end of the fabric strip 15 by stitching 25.

It has been established by experimentation that a preferred overall length for each of the fabric strips is 19 inches, with its portion 20 having a length of 3 inches and a width of a half-inch in the flat. A portion 30 extending 4 inches from the inner end of the portion 20 is of the same half-inch width.

The remainder of the free end of each strip has a continuous straight edge 31, along which the two sides of the strip are folded, but the opposite edge 32 diverges from parallelism with the edge 31 to a point 33 from which the edge converges toward the edge 31 to the blunt outer end 35 of the strip. Satisfactory results have been obtained in the practice of the invention with this angular arrangement of the edges of the strip providing a maximum width of 1-¾ inches from the edge 31 to the point 33.

These dimensions of the strips 15 are correlated with the size of the ring 16, which is preferably somewhat dish-shaped as shown, and particularly with the diameter of its central opening 40. With the dimensions of the strips 15 as stated above, a central opening 40 which is 9/32 inch in diameter will receive the narrow portions of both strips 15 slidably therethrough, and also will receive the widest part of one of strips 15 therethrough while the ring is located on the narrow portion 30 of the other strip. However, when the two strips are positioned with their widest portions together, they cannot be simultaneously withdrawn from within the ring, and even the narrow portions are frictionally retained within ring opening 40 so that the ring will not slide freely along them but will remain in any adjusted position until forced therefrom.

With these dimensional relationships, the device is assembled by inserting the end 35 of one strip in the ring opening 40 and pulling the strip therethrough until the ring is located on the narrow part 30 of the strip. The end 35 of the other strip 15 is then similarly inserted and pulled through the opening 40.

The device is then complete and ready for attachment to spectacles, by inserting the rearward end of each temple 11 in the center of the tubular insert 22. Preferably, the temple will be inserted to its full length, and the nylon lining 23 will hold the strip portion 20 in that position under the normal stresses of use, but additional adjustment is made available to the extent that the temples 11 is not fully in the strip portions 20.

After the spectacles have been set in place on the wearer's face, the wearer need only grasp the free end of a strip in each hand and pull them apart. This will force the ring 16 to travel along the narrow portion of the strips until the fit of the device around the wearer's head is comfortable, and the ring will be retained in that adjusted position by its frictional relation with the strips. Then when the wearer desires to remove the spectacles, it is merely necessary to pull the two strips apart or to grasp the ring 16 and pull it down the two strips until sufficient slack has been established for removal of the spectacles and the device from the wearer's head or to serve as a loop by which the spectacles are suspended from the wearer's neck.

While the article herein described constitutes a preferred embodiment of the invention, it is to be understood that the invention is not limited to this precise article, and that changes may be made therein without departing from the scope of the invention which is defined in the appended claims.

What is claimed is:

1. An assembly for retaining a pair of spectacles having a pair of temples on the head of a wearer, comprising
   (a) a pair of strips of fabric,
   (b) each of said fabric strips having at one end thereof a tubular portion constructed and configured to receive and retain the rearward end of one of the spectacle temples,
   (c) said tubular portion constituting a minor portion of the length of said strip,
   (d) the major portion of each said strip being essentially flat,
   (e) said flat portion of each said strip being of minimum width adjacent said tubular portion thereof and including a portion of substantially greater maximum width spaced a substantial part of the length thereof from said tubular portion thereof, and
   (f) a ring having a central opening therethrough sized to receive said minimum width portions of both of said strips simultaneously therethrough as well as said minimum width portion of one of said strips and said maximum width portion of the other said strips simultaneously therethrough but not of sufficient size to receive said maximum width portions of both of said strips simultaneously therethrough,
   (g) whereby when said tubular portions thereof are received around spectacle temples, said ring is retained between said temples and said maximum width portions of said strips, and upon separation of the free ends of said strips, said strips will be tightened behind the wearer's head by forced travel of said ring over said strips toward the wearer's head.

2. An assembly as defined in claim 1 wherein each of said strips has one substantially straight edge, and the other edge includes a pair of angularly related lengths which define said portion of said strip of maximum width.

* * * * *